United States Patent
Hu et al.

(10) Patent No.: US 8,898,738 B2
(45) Date of Patent: Nov. 25, 2014

(54) APPARATUS, SYSTEM AND METHOD FOR ACCESSING INTERNET WEBPAGE

(75) Inventors: Peng Hu, Shenzhen (CN); Zijun Zhang, Shenzhen (CN); Wenbing Ge, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/005,962

(22) PCT Filed: Dec. 12, 2011

(86) PCT No.: PCT/CN2011/083807
§ 371 (c)(1),
(2), (4) Date: Oct. 23, 2013

(87) PCT Pub. No.: WO2012/126263
PCT Pub. Date: Sep. 27, 2012

(65) Prior Publication Data
US 2014/0059649 A1 Feb. 27, 2014

(30) Foreign Application Priority Data
Mar. 23, 2011 (CN) .......................... 2011 1 0070193

(51) Int. Cl.
*H04L 29/00* (2006.01)
*H04L 29/06* (2006.01)

(52) U.S. Cl.
CPC ............... *H04L 63/08* (2013.01); *H04L 63/145* (2013.01); *H04L 63/0281* (2013.01); *H04L 63/1483* (2013.01); *H04L 63/101* (2013.01)
USPC ............... 726/3; 713/155; 713/156; 713/157; 713/158; 713/159

(58) Field of Classification Search
CPC .......................... G06F 21/606; G06Q 20/3674
USPC .................................................. 713/155–159
See application file for complete search history.

(56) References Cited

U.S. PATENT DOCUMENTS

2008/0119177 A1 5/2008 Hovnanian et al.

FOREIGN PATENT DOCUMENTS

| CN | 101132404 A | 2/2008 |
|---|---|---|
| CN | 101159000 A | 4/2008 |
| CN | 101729857 A | 6/2010 |
| CN | 101917404 A | 12/2010 |
| CN | 101977235 A | 2/2011 |

OTHER PUBLICATIONS

English translation of Written Opinion of PCT/CN2011/083807, mailing date Mar. 22, 2013.
English translation of International Preliminary Report on Patentability, PCT/CN2011/083807, Sep. 24, 2013.
Search Report for PCT/CN2011/083807 dated Mar. 22, 2012.

*Primary Examiner* — Ghazal Shehni
(74) *Attorney, Agent, or Firm* — Marshall, Gerstein & Borun LLP

(57) ABSTRACT

The present invention discloses an apparatus, system and method for accessing internet webpage. The system includes a user terminal and a proxy server. The user terminal is configured to initiate an access request to the proxy server, the access request including URL information of a target webpage which carries an identifier of requiring security authentication, and receive and display target webpage information outputted from the proxy server. The proxy server is configured to receive the access request, perform security authentication on the URL information of the target webpage which carries the identifier of requiring security authentication according to pre-stored webpage security database information; if the security authentication is passed, obtain the target webpage information and output the target webpage information to the user terminal. By applying the present invention, network delay overload for accessing the internet webpage can be reduced, and user experience can be improved.

11 Claims, 2 Drawing Sheets

APPARATUS, SYSTEM AND METHOD FOR ACCESSING INTERNET WEBPAGE

FIELD OF THE INVENTION

The present invention relates to security access technology field, and more particularly, to an apparatus, system and method for accessing internet webpage.

BACKGROUND OF THE INVENTION

In recent years, with the rapid development of smart user terminals, it becomes more and more frequent that a user uses a user terminal browser to access an internet webpage. The modes that the user uses the user terminal browser to access the internet webpage (refer to as "webpage" hereinafter) mainly include direct access and proxy server access.

The direct access mode is that when the user uses the user terminal browser to access a target webpage, the user terminal browser directly initiates an access request to the target webpage. While the proxy server access mode is that when the user uses the user terminal browser to access all webpages, the access is completed through a pre-set proxy server. That is to say, the proxy server is responsible for initiating an access request to the target webpage instead of the user, obtaining the webpage, performing a webpage conversion if necessary, and outputting the converted webpage to the user terminal browser for displaying. Comparing with the direct access mode, on the one hand, the proxy server access mode may help the user terminal to complete the webpage conversion so as to return a webpage suitable for layout and displaying by the user terminal browser. This can not only reduce the amount of calculation of the user terminal for interpreting script language, but also effectively reduce traffic of the user terminal. On the other hand, the proxy server itself has a cache function, which helps improving speed experience of the user for accessing the webpage. Based on these factors, in practical applications, the user terminal browser generally uses the proxy server to perform access. For example, mainstream user terminal browsers such as a QQ user terminal browser, UCweb and Opera Mini and so on, each provide a mechanism of proxy server access.

While bringing much convenience for the user, internet technology also brings a security problem. Especially during a process that the user terminal browser accesses the webpage, the related security problem appears gradually. For example, some malicious phishing websites or webpages trick the user to input account and password information when the user accesses the webpage, so as to steal a user account and a password. Some other malicious websites automatically collect high information service fees or deliberately set a charge trap if the user once connects and accesses the websites. In addition, there are still some websites which may affect normal use of the user terminal and damage the user terminal by issuing a link of Trojan virus installment packet. Therefore, the security risk caused by using the user terminal browser to access the webpage has become a widely concerned problem in the current mobile internet.

In order to improve security of using the user terminal browser to access the webpage, at present, when the user terminal browser accesses the internet webpage, the browser's security access can be guaranteed based on network scanning. That is to say, before the user uses the user terminal browser to download and display a webpage, i.e., when requesting an access to a target webpage, the user terminal transmits Uniform Resource Locator (URL) information of the target webpage to a security server connected to the internet, and requests the security server to authenticate the security of the URL. According to stored webpage security database information, the security server performs security authentication, and returns a security authentication response result of the URL to the user terminal. According to the security authentication response result, the user terminal performs corresponding operations: if the security authentication response result is safe, the user terminal transmits an access request to the proxy server; if the security server determines that a security risk exists in the URL, the user terminal browser may be configured by the security server to be prohibited from accessing the target webpage, and thus the user terminal cannot initiate an access request for the webpage to the proxy server; or according to security risk prompt information contained in the security authentication response result, the user determines whether to initiate an access request to the proxy server.

It can be seen from the above, the existing method for accessing internet webpage uses security data information of each webpage pre-collected by a background (the security server) to authenticate the security of the webpage to which the user requests an access, outputs the security authentication response result to the user terminal, and the user terminal determines whether to initiate an access request to the proxy server according to the security authentication response result. Therefore, the security access is achieved. But, after the security authentication is completed, since the security server also needs to transmit the security authentication information to the user terminal and then the user terminal initiates the access request, thus, the user needs to take longer time to access the webpage, resulting in certain network delay overhead. Furthermore, even for a webpage passing through the security authentication, there may be many link jumps therein. If the user needs to access a webpage corresponding to one link jump, the user terminal also needs to transmit link jump information to the security server for security authentication. Thus, accessing the webpage corresponding to the link jump, results in greater network delay which reduces the user experience. Moreover, if there is much link jump information, the user terminal needs to frequently communicate with the security server, which increases traffic overload and the cost of the user.

SUMMARY OF THE INVENTION

In view of the above, a main object of the present invention is to provide an apparatus for accessing internet webpage, which can reduce network delay overload in accessing the internet webpage and improve user experience.

Another object of the present invention is to provide a system for accessing internet webpage, which can reduce network delay overload in accessing the internet webpage and improver user experience.

Still another object of the present invention is to provide a method for accessing internet webpage, which can reduce network delay overload in accessing the internet webpage and improve user experience.

In order to achieve the above objects, the present invention provides an apparatus for accessing internet webpage. The apparatus includes an access request processing module, a security module, a target webpage pulling module and a webpage security database module, wherein the access request processing module is configured to receive an access request, and if uniform resource locator (URL) information of a target webpage included in the access request carries an identifier of requiring security authentication, output the URL information of the target webpage to the security module;

the security module is configured to perform security authentication on the received URL information of the target webpage according to webpage security database information stored in the webpage security database module, and output the URL information of the target webpage to the target webpage pulling module if the security authentication is passed;

the target webpage pulling module is configured to pull webpage information from the target webpage according to the received URL information of the target webpage and output the webpage information to a user terminal;

the webpage security database module is configured to store the webpage security database information.

A system for accessing internet webpage includes a user terminal and a proxy server, wherein the user terminal is configured to initiate an access request to the proxy server, the access request including URL information of a target webpage which carries an identifier of requiring security authentication; and receive and display target webpage information outputted from the proxy server;

the proxy server is configured to receive the access request, perform security authentication on the URL information of the target webpage which carries the identifier of requiring security authentication according to pre-stored webpage security database information; if the security authentication is passed, obtain the target webpage information and output the target webpage information to the user terminal.

A method for accessing internet webpage includes:

initiating, by a user terminal, an access request including uniform resource locator (URL) information of a target webpage which carries an identifier of requiring security authentication;

performing, by a proxy server, on the received URL information of the target webpage which carries the identifier of requiring security authentication according to pre-stored webpage security database information; if the security authentication is passed, obtaining target webpage information and outputting the target webpage information to the user terminal;

receiving and displaying, by the user terminal, the target webpage information outputted by the proxy server.

It can be seen from the above technical solution that the present invention discloses an apparatus, system and method for accessing internet webpage. The system includes a user terminal and a proxy server. The user terminal is configured to initiate an access request to the proxy server, the access request including URL information of a target webpage which carries an identifier of requiring security authentication, and receive and display target webpage information outputted from the proxy server. The proxy server is configured to receive the access request, perform security authentication on the URL information of the target webpage which carries the identifier of requiring security authentication according to pre-stored webpage security database information; if the security authentication is passed, obtain the target webpage information and output the target webpage information to the user terminal. Thus, by using the proxy server to extend the safe browsing function of the user terminal browser, authenticating the webpage via configurations of the mobile terminal browser and the proxy server and directly pulling the webpage information after the security authentication is passed, the network delay overload of accessing the internet webpage can be reduced, thereby providing safe browsing service for the user without adding additional network delay and improving user experience.

DETAILED DESCRIPTION OF THE INVENTION

In order to make objects, technical solutions and advantages of the present invention more apparent, the present invention is described in further detail hereinafter with reference to accompanying drawings and embodiments.

In the prior art, in order to improve security of accessing internet webpage, a user terminal needs to transmit URL information of a target webpage to a security server for security authentication, and determines whether to use the proxy server to initiate an access to the target webpage according to security authentication response information returned by the security server. Thus, network delay overload caused by interaction between the user terminal and the security server is increased, and user experience is reduced. In one embodiment of the present invention, the proxy server is considered to substitute the security server to authenticate the security of the webpage to which the user submits a request for access. If the webpage to which the user requests to access passes the security authentication, the user terminal directly accesses the webpage to which the user requests to access. For the webpage which does not pass the security authentication, the user terminal determines whether to access the webpage according to a security authentication response result returned by the proxy server, thus, safe browsing service can be provided to the user without adding additional network delay.

Figure 1:
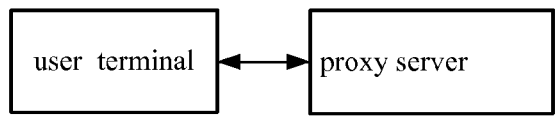
FIG. 1 is a schematic diagram illustrating a structure of a system for accessing internet webpage according to one embodiment of the present invention.

FIG. 1 is a schematic diagram illustrating a structure of a system for accessing internet webpage according to one embodiment of the present invention. As shown in FIG. 1, the system includes a user terminal and a proxy server.

The user terminal is configured to initiate an access request including URL information of a target webpage which carries an identifier of requiring security authentication to the proxy server, and receive and display target webpage information outputted from the proxy server.

In one embodiment of the present invention, the identifier of requiring security authentication may be pre-determined through negotiation by the proxy server and the user terminal.

Furthermore, the user terminal is also configured to receive a security authentication response result returned by the proxy server, determine to access the target webpage, initiate an access request to the proxy server, the access request including URL information of the target webpage which carries an identifier of mandatory access.

The proxy server is configured to receive the access request, perform the security authentication on the URL information of the target webpage which carries the identifier of requiring security authentication according to pre-stored webpage security database information; if the security authentication is passed, obtain the target webpage information and input the target webpage information to the user terminal.

In one embodiment of the present invention, the proxy server is further configured to, when the security authentication is not passed, return the security authentication response result to the user terminal; receive the URL information of the target webpage which carries the identifier of mandatory access, obtain the target webpage information and input the target webpage information to the user terminal.

The security authentication response result includes that a security level of the target webpage is unknown and the security level of the target webpage is risk.

Furthermore, for a malicious webpage of which the security level is risk or unknown, such as a chargeback website, a phishing website, a malicious information webpage and a Trojan link and so on, the information may be directly carried in the security authentication response result to prompt the user that the target webpage is a malicious webpage such as a chargeback website, a phishing website, a malicious information webpage or a Trojan link and so on.

Preferably, the proxy server is further configured to, according to information of the user terminal browser carried in the access request, convert the target webpage into a webpage structure suitable for the user terminal browser, and output the webpage structure to the user terminal to which the access request belongs.

Figure 2:
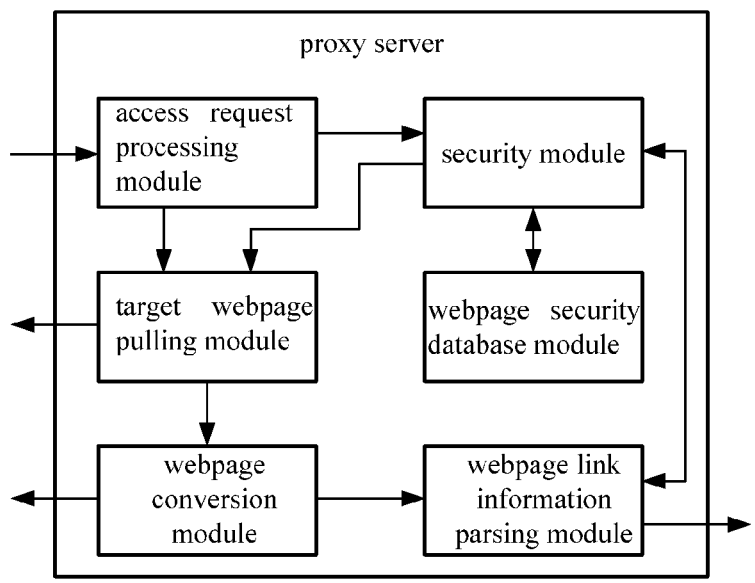
FIG. 2 is a schematic diagram illustrating a structure of a proxy server according to one embodiment of the present invention.

FIG. 2 is a schematic diagram illustrating a structure of a proxy server according to one embodiment of the present invention. As shown in FIG. 2, the proxy server includes: an access request processing module, a security module, a target webpage pulling module and a webpage security database module.

The access request processing module is configured to receive an access request, and if URL information of a target webpage included in the access request carries an identifier of requiring security authentication, output the URL information of the target webpage to the security module.

In one embodiment of the present invention, the access request processing module is further configured to determine outputting the URL information of the target webpage to the target webpage pulling module if the URL information of the target webpage included in the access request carries an identifier of mandatory access.

The security module is configured to perform security authentication on the received URL information of the target webpage according to webpage security database information stored in the webpage security database module, and output the URL information of the target webpage to the target webpage pulling module if the security authentication is passed.

In one embodiment of the present invention, the security module is further configured to return the security authentication response result to the user terminal when the security authentication is not passed. Furthermore, the security module is also configured to, after the security authentication of the URL information of the target webpage is not passed, determine that the target webpage cannot be accessed according to a pre-configured security policy, and return a security authentication response result carrying an identifier of prohibiting access. In this way, even the user terminal receives the security authentication response result returned by the proxy server and determines to access the target webpage, the user terminal does not initiate the access request to the proxy server and displays information that the target webpage is prohibited from being accessed, so as to effectively protect interests of the user. Of course, in order to respect a choice of the user, even for a webpage having security risks, an entrance of mandatory continued access is also provided for the user in a risk prompt webpage. In this condition, when the user terminal requests an access to the webpage again, a related security parameter is added to a GET method (the access request) of a Hypertext Transfer Protocol (HTTP) to indicate the proxy server that the URL request is mandatorily requested by the user. After reception, the proxy server does not automatically query the webpage security database, and directly requests and returns the webpage instead of the user.

The pre-configured security policy may be that the user is found to be a minor by searching according to user information in the access request of the user, or, the target webpage relates to filthy content such as pornography, violence and so on.

The target webpage pulling module is configured to pull the webpage information from the target webpage according to the received URL information of the target webpage and output the webpage information to the user terminal.

The webpage security database module is configured to store the webpage security database information.

In one embodiment of the present invention, the stored webpage security database information includes the URL information of the webpage and mapped security level information of the URL information of the webpage. For example, it may be pre-configured that "1" indicates that the security level is safe, "2" indicates that the security level is unknown, "3" indicates that the security level is risk. In this way, if a value of the mapped security level of the URL information of the webpage is 1, then it means that the webpage is safe.

Preferably, the proxy server further includes:

a webpage conversion module configured to, according to the information of the user terminal browser carried in the access request, convert the webpage information pulled by the target webpage pulling module into a webpage structure suitable for the user terminal browser, output the converted webpage to the user terminal to which the access request belongs.

In practical applications, even for a webpage passing through the security authentication, there may be many link jumps therein. In one embodiment of the present invention, for the condition that there are link jumps in the pulled webpage, the proxy server further includes a webpage link information parsing module configured to parse the webpage information pulled by the target webpage pulling module, obtain link jump information contained in the webpage information pulled by the target webpage pulling module, output the obtained link jump information to the security module; receive security level information outputted from the security module, embody the security level information into the link jump information of the webpage information, output the webpage information to the user terminal. Accordingly, the security module is further configured to receive the link jump information outputted from the webpage link information parsing module, perform the security authentication, output the authenticated security level information to the webpage link information parsing module. When the user terminal browses the webpage information and triggers an access to the link jump in the webpage information, the user terminal further displays the security level information corresponding to the link jump to the user. When the user determines to access the webpage corresponding to the link jump, the user terminal initiates an access request carrying an identifier of mandatory access to the access request processing module.

In this way, as mentioned above, even for a webpage having security risks, an entrance of mandatory continued access is also provided for the user in a risk prompt webpage. If the user needs to access the webpage corresponding to the link jump, it does not need to transmit the link jump information to the security server again for security authentication and this can effectively reduce network delay and network traffic of accessing the webpage corresponding to the link jump, thereby improving user experience.

It can be seen from the above description, in the system for accessing internet webpage according to one embodiment of the present invention, the user terminal initiates the access request including the URL information of the target webpage which carries the identifier of requiring security authentication to the proxy server, receive and display the target webpage information outputted from the proxy server. The proxy server receives the access request, performs the security verification on the URL information of the target webpage which carries the identifier of requiring security authentication according to the pre-stored webpage security database information; if the security authentication is passed, the proxy server obtains the target webpage information and output the target webpage information to the user terminal. Thus, by using the proxy server to extend the safe browsing function of the user terminal browser, authenticating the webpage via configurations of the mobile terminal browser and the proxy server and directly pulling the webpage information after the security authentication is passed, the network delay overload of accessing the internet webpage can be reduced, thereby providing safe browsing service for the user without adding additional network delay and improving user experience. Furthermore, by embodying the related security level information in the link jump information of the webpage information, the malicious webpage such as a chargeback website, a phishing website, a malicious information webpage and a Trojan link and so on, can be effectively and quickly prompted to the user with increasing of a small amount of additional network traffic, thereby providing necessary risk prompt to the user without extending webpage waiting time of the user.

Figure 3:
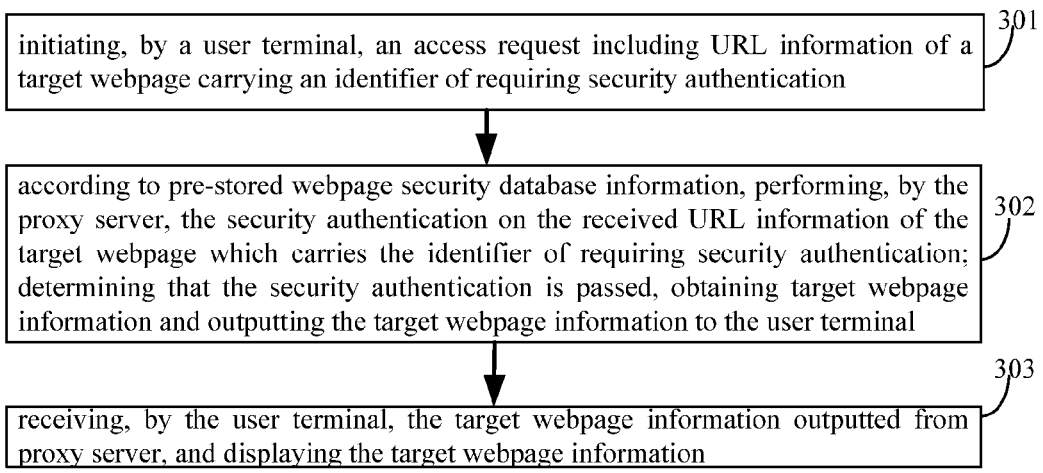
FIG. 3 is a flowchart illustrating a method for accessing internet webpage according to one embodiment of the present invention.

FIG. 3 is a flowchart illustrating a method for accessing internet webpage according to one embodiment of the present invention. As shown in FIG. 3, the process includes:

Step 301, initiating, by a user terminal, an access request including URL information of a target webpage carrying an identifier of requiring security authentication.

In this step, when the user terminal needs to access the internet webpage, the user terminal obtains the URL information of the target webpage to be accessed. The URL information carries the identifier of requiring security authentication. The URL information is encapsulated in the access request, and is sent to the proxy server.

Step 302, according to pre-stored webpage security database information, performing, by the proxy server, the security authentication on the received URL information of the target webpage which carries the identifier of requiring security authentication; determining that the security authentication is passed, obtaining target webpage information and outputting the target webpage information to the user terminal.

In the step, if the security authentication performed on the URL information of the target webpage by the proxy server is passed, the proxy server directly pulls the target webpage information according to the URL information of the target webpage. The proxy server does not need to return the authentication information to the user terminal. Thus, network delay overload of accessing the internet webpage is reduced.

Step 303, receiving, by the user terminal, the target webpage information outputted from proxy server, and displaying the target webpage information.

Preferably, performing the security authentication on the received URL information of the target webpage which carries the identifier of requiring security authentication further includes:

determining, by the proxy server that the security authentication is not passed, and returning a security authentication response result to the user terminal;

receiving, by the user terminal, the security authentication response result returned from the proxy server, determining to access the target webpage and initiating an access request including URL information of the target webpage which carries an identifier of mandatory access to the proxy server; and receiving, by the proxy server, the URL information of the target webpage which carries the identifier of mandatory access, and performing the step of obtaining target webpage information and outputting the target webpage information to the user terminal.

In practical applications, when the user terminal browser accesses the internet webpage, there are two conditions: "directly requesting webpage" and "link jump" according to ways in which the user opens the webpage. For the condition of direct requesting webpage, an opened target webpage does not include URL information of embedded linked webpage. For the condition of link jump, an opened webpage includes URL information of the embedded linked webpage, and the user may trigger an access to another webpage by clicking the URL information of the linked webpage in the opened target webpage. In one embodiment of the present invention, in order to guarantee the access security of the user, it also needed to perform security authentication on the URL information of the linked webpage. The details are described as follows.

Figure 4:
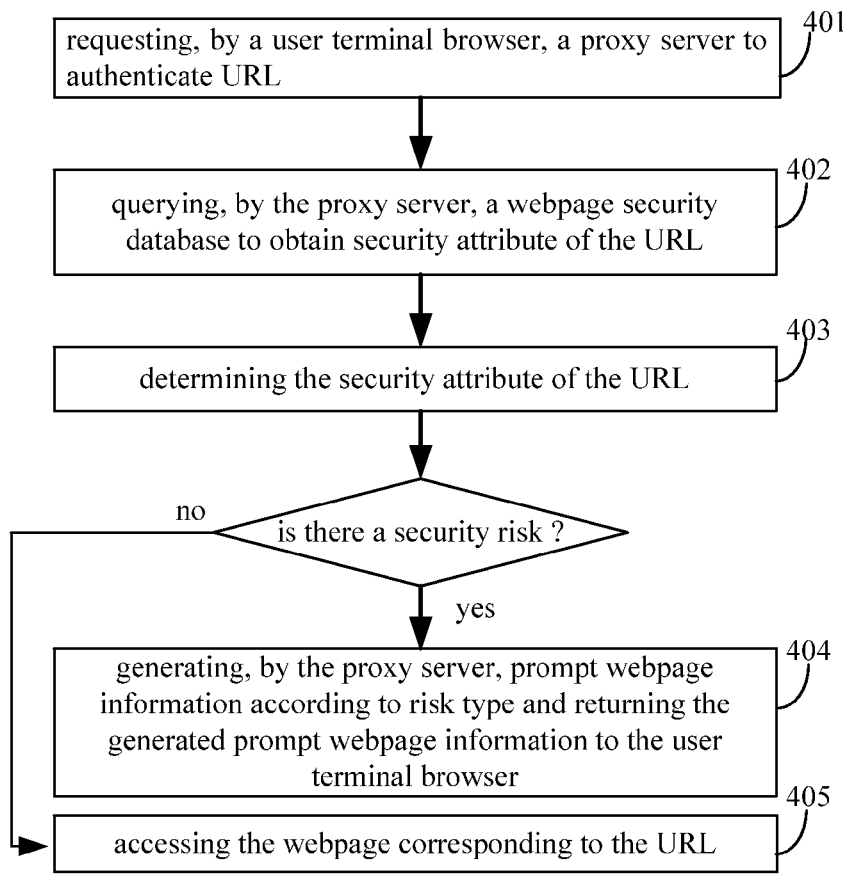
FIG. 4 is a flowchart illustrating a method for directly requesting access to webpage according to one embodiment of the present invention.

FIG. 4 is a flowchart illustrating a method for directly requesting access to webpage according to one embodiment of the present invention. As shown in FIG. 4, the process includes:

Step 401, requesting, by a user terminal browser, a proxy server to authenticate URL;

Step 402, querying, by the proxy server, a webpage security database to obtain security attribute of the URL.

Step 403, determining whether there is a security risk in the security attribute of the URL. If there is a security risk in the security attribute of the URL, performing step 404, otherwise, performing step 405.

Step 404, generating, by the proxy server, prompt webpage information according to risk type and returning the generated prompt webpage information to the user terminal browser.

In the step, the proxy server may directly return a specific webpage to inform the user of the security risk.

Step 405, accessing the webpage corresponding to the URL.

In the step, if there is no security risk in the security attribute of the URL, the webpage corresponding to the URL is directly accessed so as to provide service for the user.

Figure 5:
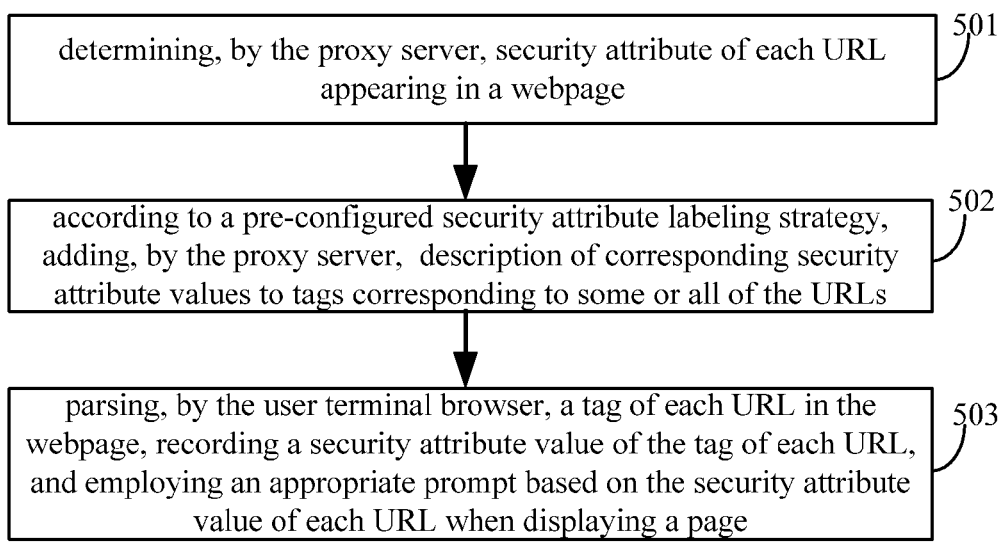
FIG. 5 is a flowchart illustrating a method for link jump accessing according to one embodiment of the present invention.

FIG. 5 is a flowchart illustrating a method for link jump accessing according to one embodiment of the present invention. Whether link jump occurs may be determined by using the proxy server to parse pulled target webpage information and to determine whether there is link jump in the target webpage information. If there is link jump in the target webpage information, referring to FIG. 5, the process includes:

Step 501, determining, by the proxy server, security attribute of each URL appearing in a webpage.

In the step, the proxy server receives webpage content returned by the target webpage (a web server). The security module of the proxy server connects the webpage security database to query security attribute for each URL contained in the webpage.

Step 502, according to a pre-configured security attribute labeling strategy, adding, by the proxy server, description of corresponding security attribute values to tags corresponding to some or all of the URLs.

In practical applications, in order to reduce processing complexity of the proxy server and the user terminal browser in newly added attributes, when the security module of the proxy server adds the security attributes, the security module of the proxy server may label URLs to be labeled according to the pre-configured security attribute labeling strategy. In one embodiment of the present invention, the security attribute labeling strategy includes: a blacklist mechanism labeling strategy, a whitelisting mechanism labeling strategy and a hybrid list mechanism labeling strategy.

1. The blacklist mechanism: a security attribute value is only added to a tag of a URL in which a security risk exists. Thus, additional processing is not needed for most of normal webpages. Accordingly, when the user tries to open a URL which has a security attribute value indicating risk, the user terminal browser may be blocked in an appropriate way and pop up a prompt message to remind the user.

Of course, as described above, when the user tries to open the URL which has the security attribute value indicating risk, the user terminal browser may also pop up a prompt of prohibiting an access to the webpage so as to block the access of the user.

The blacklist mechanism can be applied to internet environment with a relatively relaxed requirement for the safe browsing of the user terminal. Thus, only maintaining information of webpages having risk existed therein can reduce size of the database. Of course, if the webpage security database is not perfect, missed determination of some security risks may also be caused.

2. The whitelisting mechanism: a security attribute value is only added to a tag of a URL which has no security risk. Accordingly, when the user tries to open a URL which has a security attribute value indicating safe, the user terminal browser may explicitly notify the user in an appropriate way that the current access is safe. When trying to open a URL which does not have a security attribute value, i.e., other URL of which the security level is unknown or risk, the user terminal browser may not provide an indication of safe browsing. Of course, in practical applications, a risk prompt may be popped up.

The mechanism can be applied to internet environment with a relatively strict requirement for the safe browsing of the user terminal. Thus, only maintaining information of safe webpages can effectively reduce size of the database. Of course, in practical applications, if the webpage security database is not perfect, a condition that an original safe URL may not be explicitly indicated by the browser is caused.

3. The hybrid list mechanism: for a URL which has no security risk, a security attribute value is added to a tag of the URL to indicate that the URL is safe; for an uncertain URL, e.g., a URL which is not found in the webpage security database or has a security risk existed therein, additional processing is not performed, or an attribute value meaning unknown security or risk is added to a tag of the URL.

In the mechanism, the webpage security database needs to maintain the whole amount of URL information, thus, the browser may provide more clear security indications.

In the above examples, a range of values for the security attribute value relies on security status descriptions of websites, and the security status descriptions include three categories: safe, unknown and risk. The risk may be further categorized as the risk caused by a chargeback website, the risk caused by a virus website, the risk caused by a Trojan website, the risk caused by a false information website, the risk caused by a phishing website etc. The information can be indicated by a specific ID with a unified agreement established between the proxy server and the browser, thereby facilitating the browser to display a detailed risk type prompt for the user.

In the step, the security module adds a search result to a webpage script as an attribute value. For example, a normal link jump can be expressed as: <a href="http://www.qq.com">QQ</a>; the security module of the proxy server adds an attribute value of "security_level", and the new link jump can be expressed as <a href="http://www.qq.com" security_level="1">QQ</a>, wherein the value "1" indicates a safe URL.

In addition, in order to reduce the handling complexity of the browser, for all of the mechanisms, the proxy server can use a duplication deletion method when the proxy server identifies the security attribute value. Thus, the security attribute value will not be added to the same URL repeatedly, and calculation overload of the browser for parsing the tag of the URL can be reduced.

Step 503, parsing, by the user terminal browser, a tag of each URL in the webpage, recording a security attribute value of the tag of each URL, and employing an appropriate prompt based on the security attribute value of each URL when displaying a page.

In the step, the user may determine whether to access the link jump corresponding to the URL according to the prompt information. If the access is determined, an access request including the URL information of the target webpage which carries the identifier of mandatory access is initiated to the proxy server.

The foregoing are only preferred embodiments of the present invention, and are not used to limit the present invention. Any modification, equivalent replacement, or improvement made without departing from the spirit and principle of the present invention should fall within the scope of the present invention.

The invention claimed is:

1. An apparatus for accessing internet webpage, comprising an access request processing module, a security module, a target webpage pulling module and a webpage security database module, wherein the access request processing module is configured to receive an access request, and if uniform resource locator (URL) information of a target webpage included in the access request carries an identifier of requiring security authentication, output the URL information of the target webpage to the security module;

the security module is configured to perform security authentication on the received URL information of the target webpage according to webpage security database information stored in the webpage security database module, and output the URL information of the target webpage to the target webpage pulling module if the security authentication is passed;

the target webpage pulling module is configured to pull webpage information from the target webpage according to the received URL information of the target webpage and output the webpage information to a user terminal;

the webpage security database module is configured to store the webpage security database information;

wherein the security module is further configured to return a security authentication response result to the user terminal when the security authentication is not passed;

the access request processing module is further configured to determine whether the URL information of the target webpage included in the access request carries an identifier of mandatory access, and output the URL information of the target webpage to the target webpage pulling module if the URL information of the target webpage included in the access request carries the identifier of mandatory access.

2. The apparatus according to claim 1, wherein the security module is further configured to, after the security authentication is not passed, determine that the target webpage ought not to be accessed according to a pre-configured security policy, and return a security authentication response result carrying an identifier of prohibiting access.

3. The apparatus according to claim 2, wherein the security authentication response result includes: a security level of the target webpage is unknown and the security level of the target webpage is unknown.

4. The apparatus according to claim 1, wherein the apparatus further comprises:

a webpage conversion module configured to, according to information of a user terminal browser carried in the access request, convert the webpage information pulled by the target webpage pulling module into a webpage structure suitable for the user terminal browser, output the converted webpage structure to the user terminal to which the access request belongs.

5. The apparatus according to claim 4, wherein the apparatus further comprises: a webpage link information parsing module configured to parse the webpage information pulled by the target webpage pulling module, obtain link jump information contained in the webpage information pulled by the target webpage pulling module, output the obtained link jump information to the security module; receive security level information outputted from the security module, embody the security level information into the link jump information of the webpage information, and output the webpage information to the user terminal;

the security module is further configured to receive the link jump information outputted from the webpage link information parsing module, perform the security authentication, output the authenticated security level information to the webpage link information parsing module.

6. A system for accessing internet webpage, comprising: a user terminal and a proxy server, wherein the user terminal is configured to initiate an access request to the proxy server, the access request including uniform resource locator (URL) information of a target webpage which carries an identifier of requiring security authentication; and receive and display target webpage information outputted from the proxy server;

the proxy server is configured to receive the access request, perform security authentication on the URL information of the target webpage which carries the identifier of requiring security authentication according to pre-stored webpage security database information; if the security authentication is passed, obtain the target webpage information and output the target webpage information to the user terminal;

wherein the proxy server comprises: an access request processing module, a security module, a target webpage pulling module and a webpage security database module;

wherein the access request processing module is configured to receive an access request, and if URL information of a target webpage included in the access request carries an identifier of requiring security authentication, output the URL information of the target webpage to the security module;

the security module is configured to perform security authentication on the received URL information of the target webpage according to webpage security database information stored in the webpage security database module, and output the URL information of the target webpage to the target webpage pulling module if the security authentication is passed;

the target webpage pulling module is configured to pull the webpage information from the target webpage according to the received URL information of the target webpage and output the webpage information to the user terminal;

the webpage security database module is configured to store the webpage security database information;

wherein the proxy server further comprises:

a webpage conversion module configured to, according to information of a user terminal browser carried in the access request, convert the webpage information pulled by the target webpage pulling module into a webpage structure suitable for the user terminal browser, output the converted webpage structure to the user terminal to which the access request belongs.

7. The system according to claim 6, wherein the proxy server is further configured to, when the security authentication is not passed, return a security authentication response result to the user terminal; receive URL information of the target webpage which carries an identifier of mandatory access, obtain the target webpage information of the target webpage and input the target webpage information to the user terminal;

the user terminal is further configured to receive the security authentication response result returned by the proxy server, determine to access the target webpage, initiate an access request to the proxy server, the access request including the URL information of the target webpage which carries the identifier of mandatory access.

8. The system according to claim 6, wherein the proxy server further comprises:

a webpage link information parsing module configured to parse the webpage information pulled by the target webpage pulling module, obtain link jump information contained in the webpage information pulled by the target webpage pulling module, output the obtained link jump information to the security module; receive security level information outputted from the security module, embody the security level information into the link jump information of the webpage information, output the webpage information to the user terminal;

the security module is further configured to receive the link jump information outputted from the webpage link information parsing module, perform the security authentication, output the authenticated security level information to the webpage link information parsing module;

when the user terminal browses the webpage information and triggers an access to the link jump in the webpage information, the user terminal further displays the security level information corresponding to the link jump to the user; and when the user determines to access the webpage corresponding to the link jump, the user terminal initiates an access request carrying an identifier of mandatory access to the access request processing module.

9. A method for accessing internet webpage, comprising:
   initiating, by a user terminal, an access request including uniform resource locator (URL) information of a target webpage which carries an identifier of requiring security authentication;
   performing, by a proxy server, on the received URL information of the target webpage which carries the identifier of requiring security authentication according to pre-stored webpage security database information; if the security authentication is passed, obtaining target webpage information and outputting the target webpage information to the user terminal;
   receiving and displaying, by the user terminal, the target webpage information outputted by the proxy server;
   wherein after the obtaining target webpage information, before the outputting the target webpage information to the user terminal, the method further comprises:
   parsing the obtained target webpage information to obtain link jump information contained in the webpage information, performing security authentication,
   embodying authenticated security level information into the link jump information contained in the target webpage information according to a pre-configured security attribute labeling strategy.

10. The method according to claim 9, wherein the performing, by a proxy server, on the received URL information of the target webpage which carries the identifier of requiring security authentication further comprises:
    determining, by the proxy server that the security authentication is not passed, and returning a security authentication response result to the user terminal;
    receiving, by the user terminal, the security authentication response result returned from the proxy server, determining to access the target webpage and initiating an access request to the proxy server, the access request including URL information of the target webpage which carries an identifier of mandatory access;
    receiving, by the proxy server, the URL information of the target webpage which carries the identifier of mandatory access, and performing the step of obtaining target webpage information and outputting the target webpage information to the user terminal.

11. The method according to claim 9, wherein the security attribute labeling strategy comprises: a blacklist mechanism labeling strategy in which a security attribute value is only added to a tag of a URL having a security risk, a whitelisting mechanism labeling strategy in which a security attribute value is only added to a tag of a URL having no security risk, and a hybrid list mechanism labeling strategy in which a security attribute value is added to a tag of each URL.

\* \* \* \* \*